United States Patent [19]

Rogers

[11] Patent Number: 5,652,786
[45] Date of Patent: Jul. 29, 1997

[54] AUTOMATED INTERACTIVE BILL PAYMENT SYSTEM

[75] Inventor: Catherine R. Rogers, Dallas, Tex.

[73] Assignee: Telepay, Dallas, Tex.

[21] Appl. No.: 649,926

[22] Filed: May 16, 1996

Related U.S. Application Data

[63] Continuation of Ser. No. 442,129, May 16, 1995, abandoned, which is a continuation of Ser. No. 195,372, Feb. 14, 1994, abandoned.

[51] Int. Cl.$^6$ .................................................. H04M 11/00
[52] U.S. Cl. .......................................... 379/91.01; 395/240
[58] Field of Search .................... 379/91, 93, 95, 379/97, 98, 106, 107, 143, 144; 364/401 R, 408, 406, 405; 235/375, 379, 380

[56] References Cited

U.S. PATENT DOCUMENTS

| | | | |
|---|---|---|---|
| 4,674,044 | 6/1987 | Kalmus et al. | 364/408 |
| 4,694,397 | 9/1987 | Grant et al. | 364/408 |
| 4,823,264 | 4/1989 | Deming | 364/408 |
| 4,947,028 | 8/1990 | Gorog . | |
| 5,121,945 | 6/1992 | Thomson et al. | 283/58 |
| 5,126,936 | 6/1992 | Champion et al. | 364/408 |
| 5,220,501 | 6/1993 | Lawlor et al. | 364/408 |
| 5,283,829 | 2/1994 | Anderson | 380/24 |
| 5,285,382 | 2/1994 | Muehlberger et al. | 364/401 |
| 5,383,113 | 1/1995 | Kight et al. | 364/401 |

FOREIGN PATENT DOCUMENTS

WO93/04435  3/1993  WIPO .

OTHER PUBLICATIONS

Information Networks, V6, No. 8, Jul. 26, 1993, Scanfone Alive and Well; Bell Atlantic Readiesfor Rollout.

Tanaka, David; 'Interac rolls out debit card system'; Computing Canada vol v18 issue n 21; Oct. 13 1992.

Blackwell, Gerry; "Computing in banking ; technology is the weapon"; Computing Canada v16 p.59. Oct. 11 1990.

"The Score Card Evens in a POS Title Fight"; Bank Network News Jun. 11 1992. VlONZ.

*Primary Examiner*—Wing F. Chan
*Attorney, Agent, or Firm*—Haynes and Boone, L.L.P.

[57] ABSTRACT

Method and apparatus for processing payment transactions using debit card numbers without the requirement of a personal identification number (PIN) is disclosed. A telepay system of the present invention provides an interface between a standard touchtone telephone and at least one debit card network such that real-time bill payment transactions may be effected using a keypad of the telephone. The telepay system includes an interactive voice response unit for prompting a payor to enter an access code, account number, debit card number and payment amount and for informing the user of the status of the transaction. Real-time processing of transactions is provided through use of debit card networks, rather than the Automated Clearing House. The telepay system is also capable of performing settlement functions and processing inquiries by payees of the system regarding previously processed transactions.

30 Claims, 9 Drawing Sheets

AUTOMATED INTERACTIVE BILL PAYMENT SYSTEM

This is a continuation of application Ser. No. 08/442,129, filed on May 16, 1995, which is a continuation of application Ser. No. 08/195,372, filed on Feb. 14, 1994, both abandoned.

TECHNICAL FIELD

The invention relates generally to systems for electronic bill payment systems and, more particularly, to a universal, real-time bill payment system method and system that uses debit (ATM) cards without the requirement of a PIN (personal identification number) in conjunction with touch tone telephones to initiate consumer bill payments electronically and provide for the elimination of paper checks and the heretofore use of the Automated Clearing House of the U.S. Banking System to settle individual items.

BACKGROUND OF THE INVENTION

Bill payment by telephone has been available primarily from financial institutions for approximately 15 years. Heralded as "home banking" this technology allowed a customer of a bank, savings and loan, or credit union to pay any pre-registered bill with the use of a touch tone telephone and that financial institutions interactive voice response unit (provided that they offered the service). The customer would first have to select a financial institution that offered the service, request to participate in the service, send in a voided check, and then provide a manual list of all the bills that were desired to be paid using this system. In addition, a signature authorization card would have to signed and archived by the financial institution. The financial institution would then manually input all of this information into their computer, and then advise the customer that system access was then available. This process usually took up to two weeks to complete.

Once activated, the customer would then have the capability to call the financial institution and input payment instructions in conjunction with a touch tone telephone and reference each payee by a number that was assigned by the financial institution. This process of bill payment would allow the customer to pay bills by having the bank then issue an "electronic check" to the designated payee. This "electronic" document would then be presented to the Automated Clearing House of the U.S. Banking System for processing and clearing. In reality the process was identical to the processing of a paper check, with the only exception being that there was not any paper involved in the transaction. The payment could still "bounce" and be returned for non-sufficient funds since there was no actual verification on the customer's account balance to insure that sufficient funds were on deposit to cover the transaction. In addition, all in place check clearing time requirements were still in place, as it took typically at least 3-5 days to clear. Until clearing was realized the recipient of the funds never had actual use of the funds used for payment. If a new debt was incurred, it would have to be pre-registered on the system in order to utilize this "electronic" capability. If a customer changed financial institutions, the whole process of pre-registering all debts, signature cards, and a voided check would have to be repeated. Existing pay by phone systems offered some convenience to the user, but were cumbersome to administer and usage was never widespread.

As "home banking" gained more interest, many companies developed special purpose telephones with visual displays and "swipe card readers" that the consumer could purchase that would allow the use of a debit (ATM) card to basically achieve the same purpose as was evident in previously implemented systems (for the purposes of brevity in this disclosure the term "debit card" shall be construed to mean both debit and credit card). The only difference was that the consumer could now "swipe" the debit card through the reader that was part of the telephone. The Automated Clearing House of the U.S. Banking System was still used to process payments, and all pre-registration and signature cards were still required. All "electronic check" clearing time requirements were still needed, and the transaction would still be returned for non-sufficient funds. If a service offered a specialized telephone and bypassed the Automated Clearing House, using debit card networks, the debit card used to process the transaction required a PIN. There was a natural resistance to the purchase of special telephones that proved to be relatively expensive, in addition to the monthly fees necessary to remain a customer of this service.

As personal computers began to proliferate, many systems became available that would allow bill payment in conjunction with a third party service and a personal computer owned by the user with that third party software loaded into it, such as the Prodigy system. Still, however, all of the aforementioned limitations still applied to these personal computer based systems.

In summary, these home banking systems shared many common drawbacks. For example, the burden of pre-registration and the listing of bills to be paid was borne by the consumer. The system required the processing of transactions in the same manner as a paper check, or an electronic check through the Automated Clearing House of the U.S. Banking System. The system presented the possibility that a transaction could be returned for non-sufficient funds reasons. In addition, a clearing time for each transaction of 3-5 days. Furthermore, in many cases, the prior art home banking systems required the use of specialized equipment by the customer (such as special purpose telephones equipped with electronic card readers or encryption devices), or the financial institution offering services to it's customer base.

Moreover, although it is known in the field of accounting to call and manually, in conjunction an operator, verify that a payor had remitted a bill, there is no capability for the recipient of the funds (payee) to electronically immediately and positively inquire as to payment status after it was electronically authorized by the a debit card network. Therefore, what is needed is a universal, real-time bill payment system method and system that uses debit (ATM) cards without the requirement of a PIN (personal identification number) in conjunction with touch tone telephones to initiate consumer bill payments electronically and provide for the elimination of paper checks, as well as the use of the Automated Clearing House.

SUMMARY OF THE INVENTION

The foregoing problems are solved and a technical advance is achieved by method and apparatus of the present invention for an improved universal bill payment system. In a departure from the art, bills may be paid using a telephone connectable to at least one remote debit card network via a telepay system.

In a preferred embodiment, the method of the present invention Comprises steps of prompting a caller to enter an access code using a keypad of said telephone, said access code identifying a current payment transaction; responsive to entry of an access code, determining whether said entered access code is valid; prompting said caller to enter an account number using said telephone keypad, said account number identifying a payee in connection with said current payment transaction; responsive to entry of an account number, determining whether said entered account number is valid; prompting said caller to enter a debit card number using said telephone keypad, said debit card number identifying a payor in connection with said current payment transaction; responsive to entry of a debit card number, determining whether said entered debit card number is valid; prompting said caller to enter a payment amount using said telephone keypad; responsive to a determination that a payment amount has been entered and further responsive to a determination that said entered access code, account number and debit card number are valid accessing a remote debit card network associated with said entered debit card number, said accessed remote debit card network determining whether sufficient funds exist in an account associated with said entered debit card number to complete said current payment transaction, responsive to a determination that sufficient funds exist in said associated account, deducting said entered payment amount from said account associated with said entered debit card number, adding said entered payment amount to an account associated with said entered account number and informing said caller of an approval code issued by said accessed remote debit card network and storing said entered access code, account number, debit card number and payment amount in a transaction log file of said telepay system, and responsive to a determination that sufficient funds do not exist in said associated account, informing said caller that said current payment transaction has been declined and terminating said current payment transaction.

A technical advantage achieved with the invention is that it enables the use of debit card (ATM) networks for a real-time positively authorized bill payment that inquire electronically against balances on deposit PRIOR to the processing of the bill payment transaction, thus eliminating the Automated Clearing House to process individual transactions.

Another technical advantage achieved with the invention is that it enables real-time inquiry capability into the consumers balances at virtually any U.S. financial institution in order to verify funds on deposit prior to processing the transaction, thereby eliminating the possibility of a non-sufficient funds occurrence.

Another technical advantage achieved with the invention is the elimination of a PIN (personal identification number) in conjunction with debit card number usage in order to comply with Regulation E of the U.S. Banking Regulations by maintaining security and frequency of usage restrictions in the method and process.

Yet another technical advantage achieved with the invention is the integration of interactive voice response technology and debit card number authorization processing with electronic funds transfer bill payment method and process.

Still another technical advantage achieved with the invention is the elimination of any specialized equipment on the part of the consumer to process an electronic bill payment (i.e., personal computers, specialized telephones or terminals, etc.).

A further technical advantage achieved with the invention is the elimination of any pre-registration or "sign up" procedure on the part of the payor.

A final technical advantage achieved with the invention is the provision to the recipient of the bill payment of an electronic daily general ledger or activity summary, that balances back to the gross amount of electronic deposits made in the designated bank accounts by the utilized debit card networks. Moreover, the system of the present invention offers to the consumer the advantage of anywhere, anyplace, anytime, convenience with complete spontaneity as to the system usage.

DESCRIPTION OF THE PREFERRED EMBODIMENT

Figure 1:
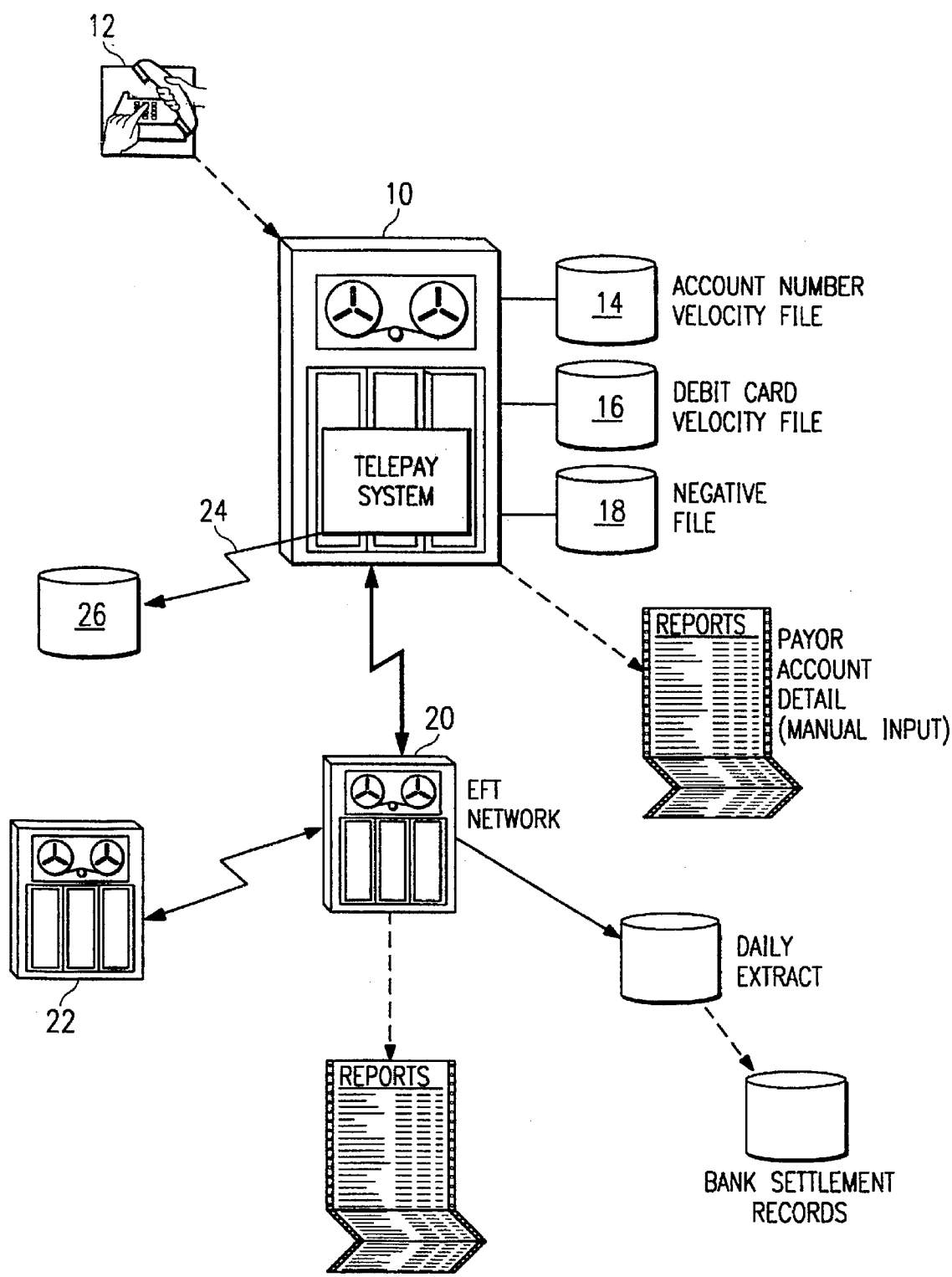
FIG. 1 is a block diagram of a telepay system embodying features of the present invention.

Referring to FIG. 1, the general operation and structure of the system of the present invention will be described, it being understood that the operation of the system will be described in greater detail with reference to FIGS. 2A–2G, 3 and 4. When a consumer calls into the TelePay system 10 using a telephone 12, the consumer is prompted by an interactive voice response unit within the system 10 to input certain necessary information, to wit, payee access code, debit card number, account number, and amount. The TelePay system 10 then checks all of its internal files, including an account number velocity file 14, a debit card velocity file 16 and a negative file 18, to validate the access code entered, the card number presented, the validity of the account number, and if that card number and/or account number has ever processed a fraudulent transaction. If any of these internal checks into the TelePay system 10 process indicate fraud, then the transaction is denied. If all of the checks are passed, then the TelePay system 10 assembles the data into an authorization request message, which is electronically sent to a debit card network 20 for transmission to a financial institution 22 that issued the card for verification of balance on deposit.

The debit card network 20 receives a response as to whether or not the there are sufficient funds on deposit to process the transaction requested by the consumer. The debit card network 20 prepares an appropriate deduction from the consumer's account and prepares an appropriate deposit to the payee's account to be processed later. In addition any fees that are due from the payor are also preprocessed at this time. The debit card network then sends a message to the TelePay system 10 while the consumer is still on the telephone 12 line. The TelePay system 10 will then translate the numeric data received into an audible verbal response transmitted to the consumer via the telephone 12.

Figure 3:
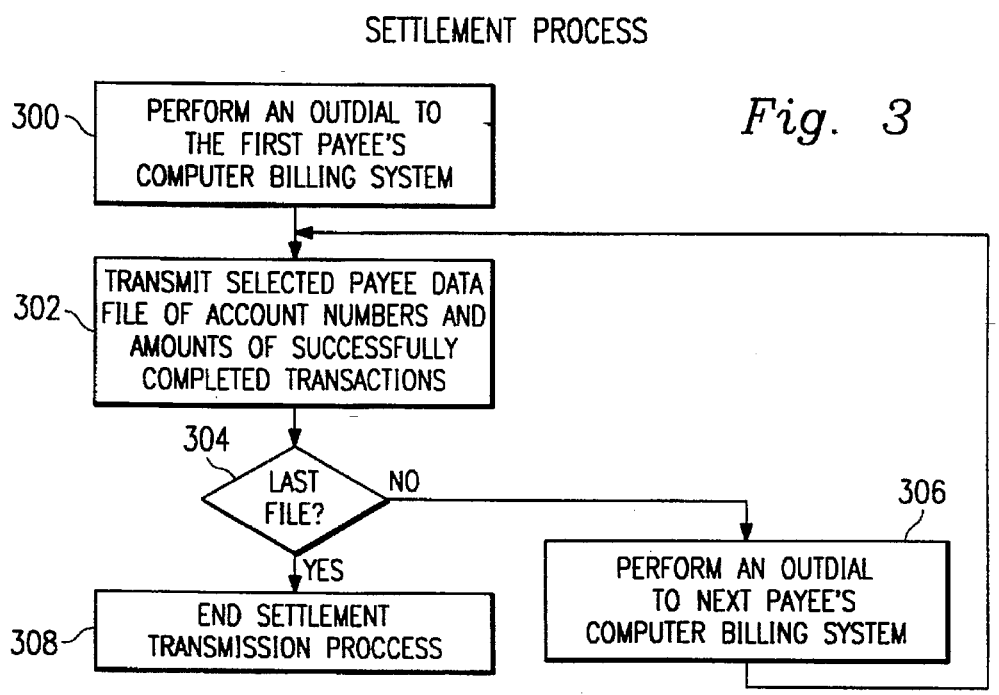
FIG. 3 is a flowchart of a settlement process of the present invention.

Settlement, as described in greater detail with reference to FIG. 3, is defined herein as the methodology of debiting and crediting the appropriate accounts affected by the above-described transaction. These accounts would affect the payor, the payee, and the TelePay system 10 for any transaction fee. The debit card network 20 will initiate this process. The debit card network 20, however will only deposit a TOTAL of the days transactions into the payee's account. The network has no capability to discern which consumer paid how much. It then becomes the responsibility of the TelePay system 10 to detail the specific account numbers and amount of payments that were made that day.

This is accomplished by a computer dial-up link (RJE) 24 from the TelePay system 10 to the payee's billing system 26. The TelePay system 10 will also bill the payee on a monthly basis for 800 telephone line usage (if any). The accounts receivable department of the payee is also provided with the capability to call into the TelePay system 10 to inquire as to if and when a consumer initiated a payment.

A single 800 number is used by the TelePay system 10. Technology allows for a virtually unlimited number of telephone lines to terminate on the same number, limited only by the compliment of computer hardware and it's capabilities that are running the system. The caller will be asked to enter the access code of the bill to be paid. This access code typically will be printed on the bottom of the statement in an obvious manner and is a requirement of all payees utilizing the service. The code will identify the payee within the TelePay system 10 and will activate the TelePay software to verbalize the customer's selection in order to give positive re-enforcement as is the case with all customer input (i.e. "you have elected to pay Florida Power and Light in Miami, Fla." Press 1 if this is correct and you wish to continue, or press 2 if incorrect"). If incorrect, the customer will be asked to input another access code, or to terminate the call. Assuming the proper access code is confirmed, the next step will be the entering of the account number of the bill to be paid, as this number also appears on the monthly statement. All selections will be verbally re-enforced.

The next step will be the entering of the debit (ATM) card number. Various TelePay system 10 checks will be done on this entry. Verbal re-enforcement of the numbers entered is again given to the user ("You have entered 5419 23485 4657. Please press 1 if correct or 2 if incorrect"). The TelePay system 10 will then instruct the user to enter the amount of the payment and verbal positive re-enforcement will be given. If all has been acknowledged positively up to this point, then the system will give a verbal summary of the transaction and give the customer a final opportunity to Validate the entries ("Press 1 if correct, or press 2 if incorrect"). When the transaction has been positively re-enforced by the user, the TelePay system will then build an authorization request that will be sent out to the existing debit (Electronic Funds Transfer) networks. When the transaction has been authorized, the system will once again give positive re-enforcement to the user ("Your payment to Dallas Gas and Electric in the amount or $124.56 has been paid from your ATM card account number 5419 23485 4657. Your authorization number for this transaction is XXXXXXX. Please make a note of this authorization code for future reference. If you would like to hear the authorization code for this transaction again, press 1. If you would like to pay another bill press 2. If you are finished press 3.").

If the user elects to pay another bill during the same session, then the system will retain the previously entered card number and ask the caller if the next bill being paid is to be paid with the same card, or allow the opportunity to enter a new card number.

All of the debit (Electronic Funds Transfer) networks are accustomed to the assessment, debiting and crediting of fees to the issuers and acquirers of debit (ATM) and credit transactions. In many cases, a 75¢ fee for a customer to use an ATM card at an ATM that is not owned by the card issuing bank involves the dividing of that fee into increments as small as 5¢. In this manner all networks that are accessed are compensated to assist in the authorization and routing of the transaction. All of these fees are electronically credited to the entity that earned the revenue as a result of a contractual relationship with that particular network. This process happens every working day at a predetermined "cut off" period that separates business days and is refereed to in the industry as "settlement".

Never before, however, has a transaction been presented to the debit networks for a real-time authorized bill payment initiated by the consumer from a touch tone telephone with the debit card used as the transaction vehicle. Additionally, it has never been done without the requirement of a PIN (personal identification number) and still maintain transaction security. In the TelePay System 10, when a transaction is entered by a consumer, and subsequently passed on to an outside debit card network for authorization, a number of things happen.

Assuming that the transaction is authorized, then any fee that the customer is paying, in addition to the actual bill payment, is automatically deducted from the payor's account immediately and added to the amount that the debit card network will owe TelePay and the payee at settlement. The amount of the bill that was paid is automatically added to the amount that will be credited to the payee at the end of the business day (every payee is required to provide a bank account number that will be used to electronically credit the days receipts). TelePay's bank account will, in a like manner, be automatically credited for the transaction fee. Any network usage fees that have to be paid to process the transaction by the use of an debit card network will be electronically paid by the TelePay system 10 to the appropriate service provider. Once a day at TelePay's settlement time, each payee participating in the system will receive the electronic on-line detail summary of the days individual transactions for posting to the consumer's account.

A flowchart illustrating the operation of a bill payment transaction process of the TelePay system 10 is shown in FIGS. 2A–2G. The process is initiated by a user's calling into the system 10. In step 200, a general purpose welcome message that announces and instructs the caller in the manner with which the system can be used is transmitted to the user via the telephone 12 (FIG. 1). In step 202, the user is prompted to enter a payee access code, which is assigned by the embodiment of the invention in the form of a service and the user is made aware of this code due to its printed presence on the monthly customer statement, statement stuffers or other printed handouts. This code is what distinguishes one payee from the other, and is the identifier that causes the system 10 (FIG. 1) to record the transaction in the appropriate payee record file.

After the caller enters the access code, it is electronically checked against the list of authorized payees participating in the system 10 in step 204. In step 206, a determination is made whether the entered access code is valid. If the access code is invalid, in step 208, the system 10 checks to determine whether this is the third incorrect entry of an access code. If this is not the third incorrect entry of the access code, in step 210, the system 10 instructs the caller that the access code is invalid, and offers the caller to opportunity to re-enter the access code in step 202. If this is the third incorrect entry of an access code, in step 212, the system 10 instructs the caller to check the access code information and call again.

If the access code is entered properly within three attempts, in step 214, the caller is prompted to enter the account number of the bill that they are paying. In step 216, the system 10 checks the account number for validity. The validity check is based on the methodology that the payee uses to verify account numbers and will vary according to payee. The system 10 will have all of the participating payees verification methodologies. This methodology could be a MOD 10 or MOD 11 check digit routine with or without a check digit in it's most basic implementation. In a more sophisticated environment, the system would have in it's database, a list of all the valid account numbers for that particular payee, commonly known to those skilled in the art as a "shadow file."

In step 218 (FIG. 2B), a determination is made as to the validity of the account number entered. If the entered account number is not valid, in step 220, a determination is made as to whether this is the third incorrect entry. If it is not the third incorrect entry, in step 221 (FIG. 2A), the caller is informed that the entry is invalid and is given an opportunity to reenter the account number. If the entry attempt is the third invalid attempt, in step 222, the caller is instructed to check their information and call again. If a valid account number is entered within three attempts, in step 224, the system 10 requests the caller to enter the debit card number.

In step 226, the debit card number is checked for validity. This validity check is done via the MOD 10 algorithm that is the basis for debit card issuance used by financial institutions. Using this method that is commonly used, and familiar to those skilled in the art, gives a great level of assurance that the number that was entered by the caller was entered properly. In step 228, a determination is made whether the entered debit card number is valid. If the entered debit card number is not valid, in step 230, a determination is made whether this is the third invalid entry. If this is not the third invalid entry, in step 232, the caller is instructed of the invalid entry and then, in step 224, is requested to enter a debit card number.

If this is the third invalid entry, in step 234, the system 10 requests the caller to check their information and call again. Once a valid debit card number is entered within three attempts, in step 236 (FIG. 2C), the caller is requested to enter the dollar amount (without a decimal) of the bill to be paid. In step 238, the system 10 repeats the entered amount to the caller and, in step 240, asks the caller to indicate whether the entry is correct by depressing a key on the keypad of the telephone 12. In step 242, a determination is made whether the caller responded that the entry is correct. If the entry is not correct, in step 244, a determination is made whether this is the third incorrect entry. If this is not the third incorrect entry, in step 236, the caller is requested to enter a new dollar amount. If this is the third incorrect entry, in step 246, the caller is requested to check their information and call again.

If the caller enters a correct amount within three attempts, in step 248 (FIG. 2D), the system 10 initiates a velocity file 14 check. The velocity file 14 is an internal file to this invention that restricts the number of times that a payor account number can be paid electronically using the system 10 over a 30 day period. The numerical value of the velocity file is individually selectable by each payee participating in the system 10, and will prevent excessive payments from their customers that have the potential for fraud. In step 250, if payments are located in the velocity file 14 that indicate to the system 10 a violation of the number of transactions permitted over a 30 day period by the payee, in step 252, the caller is notified that their transaction cannot be processed, due to the excessive frequency of usage. If the transaction is within the number allowed by the payee over a thirty day period, in step 254, the system 10 performs the velocity file check on the debit card number that the caller entered.

The numerical value of the debit card velocity file 16 is determined by the system 10 based on, but not limited to, historical usage data of all payees and payors over a given period of time. This value is variable and is achieved generally by multiplying the total number of payees participating in the system times the total number of payments allowed by each payee over a 30 day period. If the system 10 determines that the transaction by the payor exceeds the debit card velocity file criteria, in step 256, the caller is notified that the transaction cannot be processed due to the frequency of the number of uses of the debit card used to process transactions over a thirty day period.

If the transaction by the payor does not exceed the debit card velocity file criteria, in step 258 (FIG. 2E), the system 10 determines whether either the payor account number or the debit card number is contained in the negative file 18 comprising a database of negative accounts stored on the system 10. The purpose of the negative file 18 maintained by the system 10 is to prevent debit card numbers and account numbers that have been involved in fraudulent transactions from initiating another transaction. This file is updated by payees participating in the system by written notification to the service. An employee of the service would then update the system.

If the system 10 determines that a match on either payor account number or debit card number has been found, in step 260, the caller is informed that the transaction cannot be processed. If there is not a match found on the negative file 16, then the details of the transaction are summarized to the caller verbally on the interactive voice response system in step 262. In step 264, the caller is prompted to begin the processing of the transaction by pressing one (1) on the telephone keypad, or by pressing two (2) on the telephone keypad to abort the transaction. In step 266, the system 10 checks the caller's response. If two has been depressed by the caller, in step 268, the system 10 thanks the caller and terminates the call.

If one has been depressed by the caller, in step 270 (FIG. 2F), the system 10 outdials via a normal telephone line to an appropriate debit card network, such as the network 20 for processing. A debit card network is a third party processor that will process the transaction for a fee, providing connectivity to either the financial institution that issued the debit card number, or another debit card network that has the capability to connect with the financial institution that issued the debit card number.

Those skilled in the art are aware that a debit card network, i.e. Pulse in Houston, Tex., MOST in Washington, D.C., Honor in Maitland, Fla., etc., process primarily ATM (Automated Teller Machine) transactions, and do not rely on the Automated Clearing House (ACH) to process individual transactions. In addition to the face value of the bill to be paid, the system adds a service charge that the caller will electronically pay for use of the convenience of the system. Through the use of the debit card network, rather than the ACH, the transaction is positively verified against funds on deposit prior to the processing of the transaction. In step 272, while the system 10 is outdialing to the debit card network 20, the system 20 plays a customized individually recorded marketing message for each payee utilizing the system 10, that will promote a Service of the payee while the caller is awaiting approval. If the debit card network and the subsequent transmission to other debit card networks (if required) make the determination that funds are not available in the caller's account selected by the debit card number, then the transaction will be declined.

In step 274, the system 10 awaits a reply from the debit card network 20. In step 276, the system 10 then makes a determination on the disposition of the transaction based on the response received back form the debit card network 20. If the response from the debit card network 20 indicates to the system 10 a declination, with which those skilled in the art are familiar, in step 278, the system 10 informs the caller that the transaction was declined by the financial institution that issued their debit card number. If the response from the debit card network 20 indicates an approval, the caller will be verbally informed of the approval code in step 280. In step 282, the approved transaction is updated in a system transaction log file that will later become the basis for the transmission for payment data to each individual payee. The transaction log file contains the debit card number, payor account number of the bill paid, amount of the bill paid, time/date, and approval code. The log file is individually kept for each payee participating in the system for later electronic transmission for billing system update.

Figure 2A:
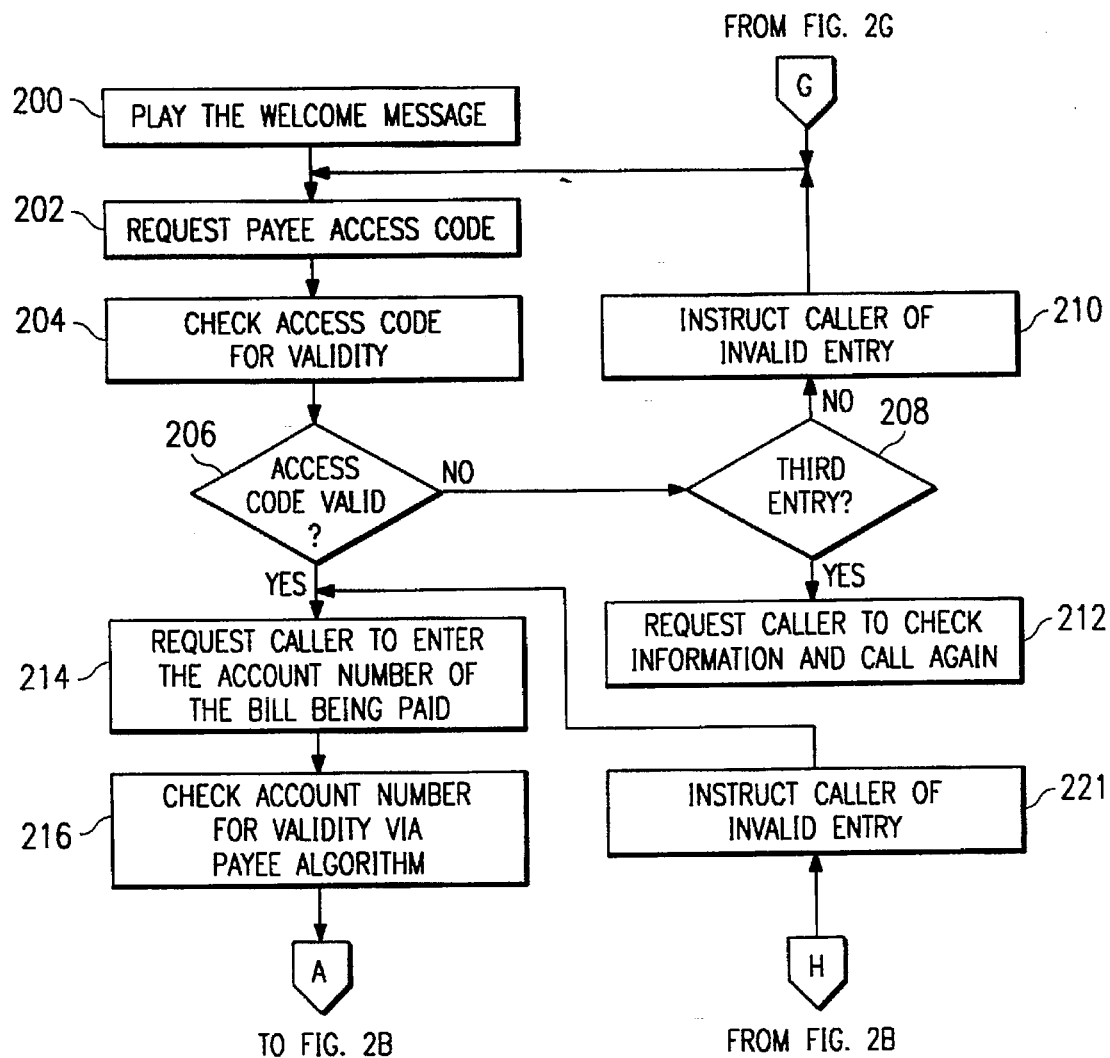
FIGS. 2A–2G illustrate a flowchart of a bill payment transaction process of the present invention.
Figure 2B:
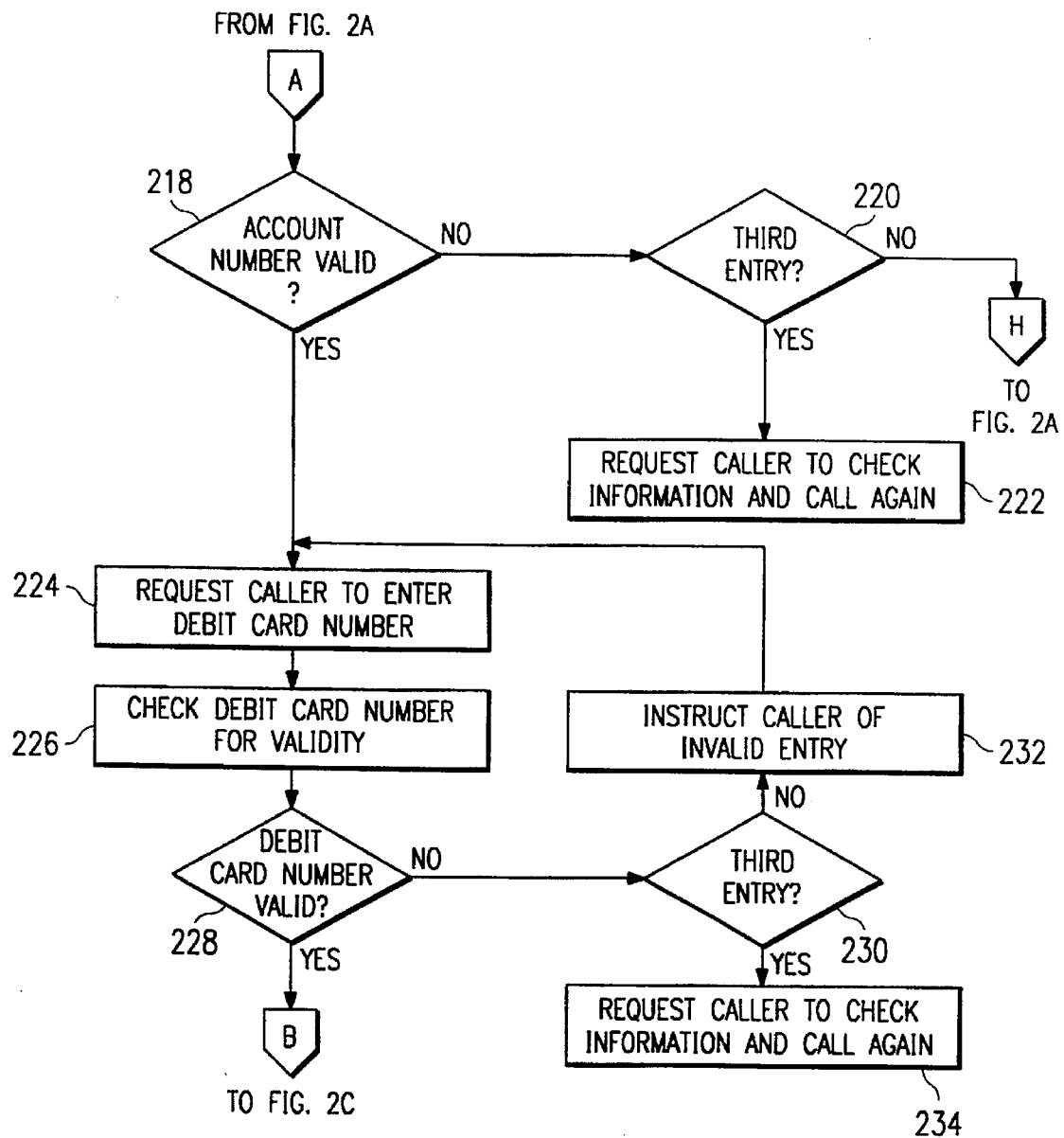
Figure 2C:
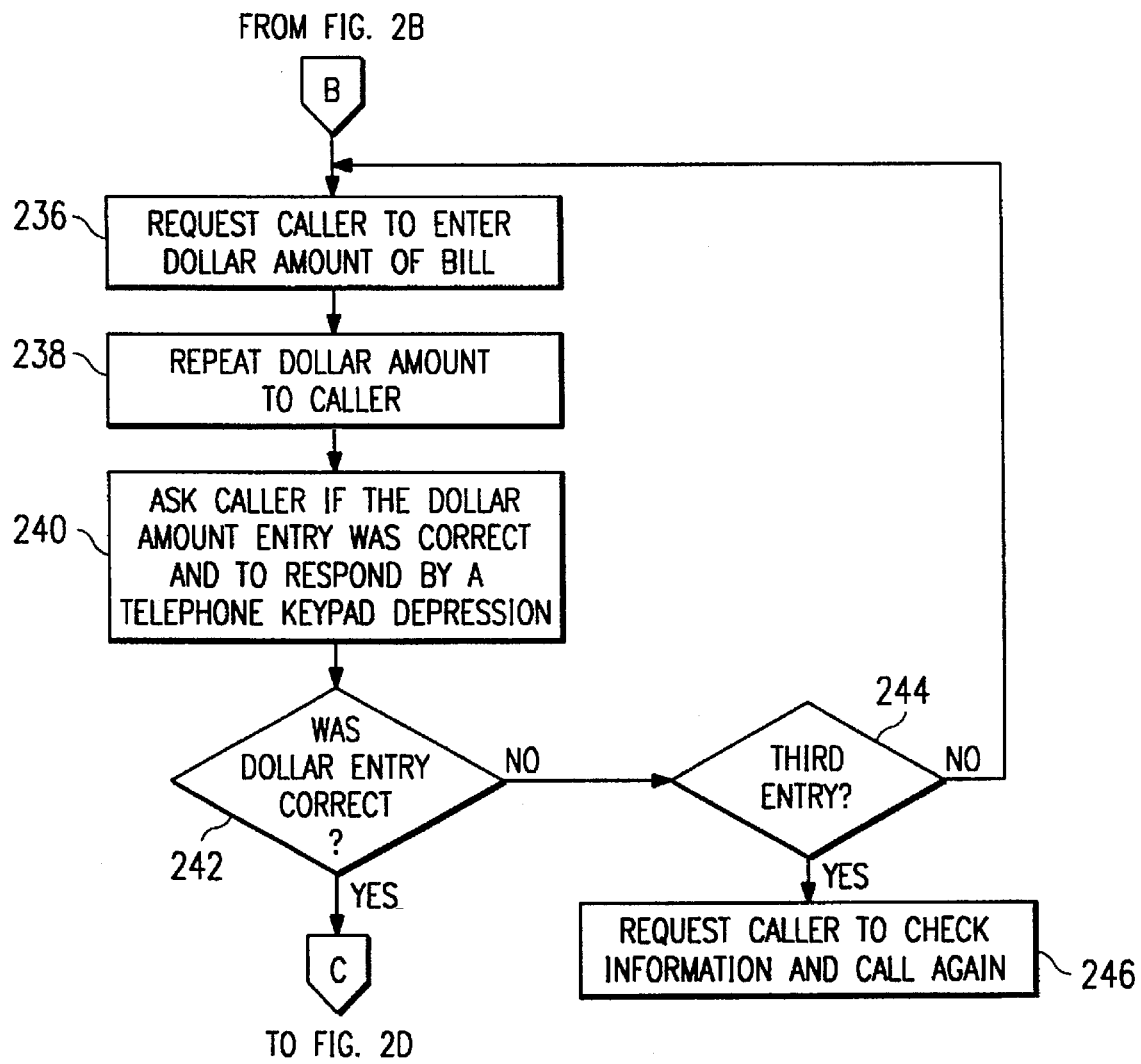
Figure 2D:
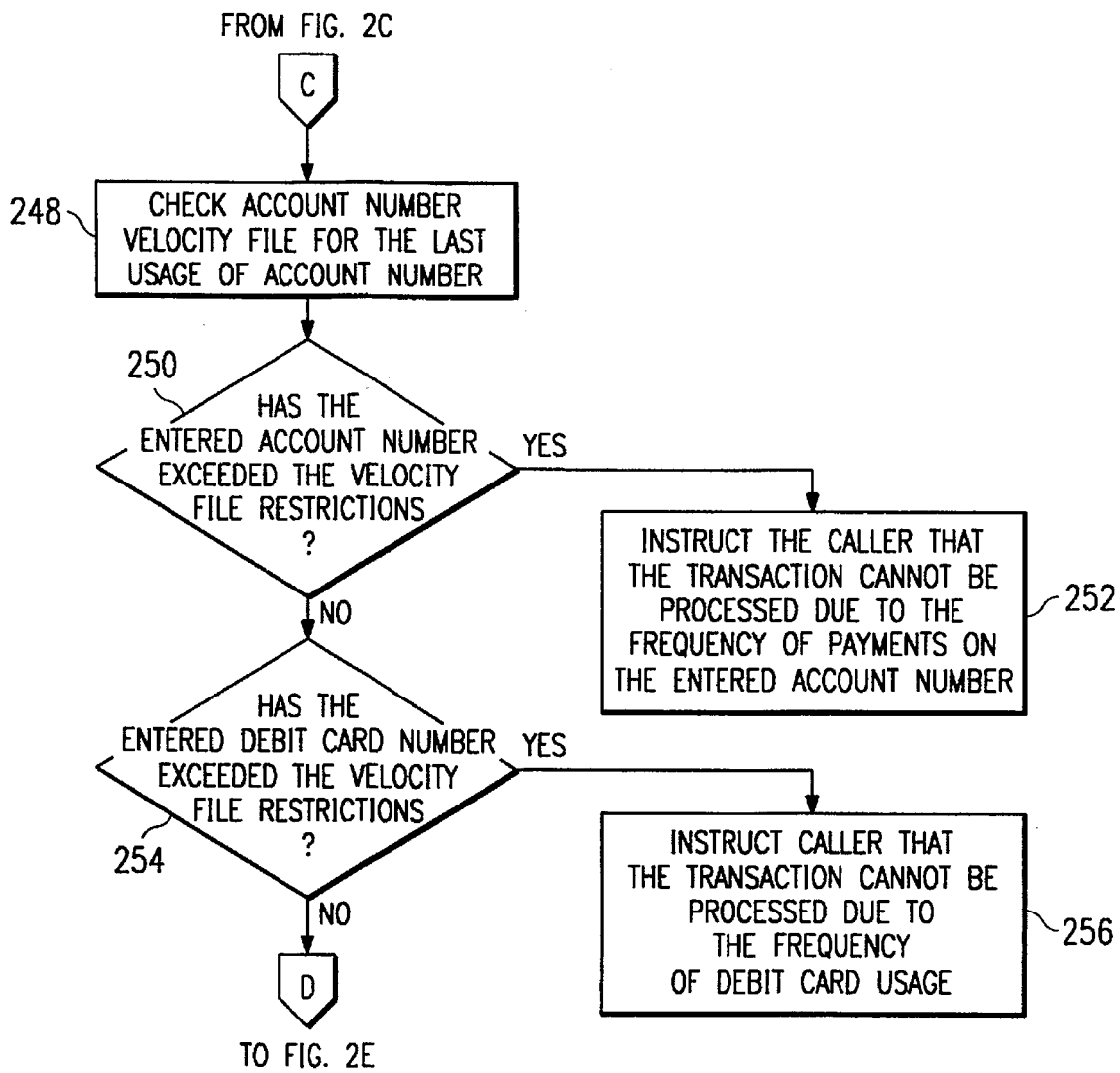
Figure 2E:
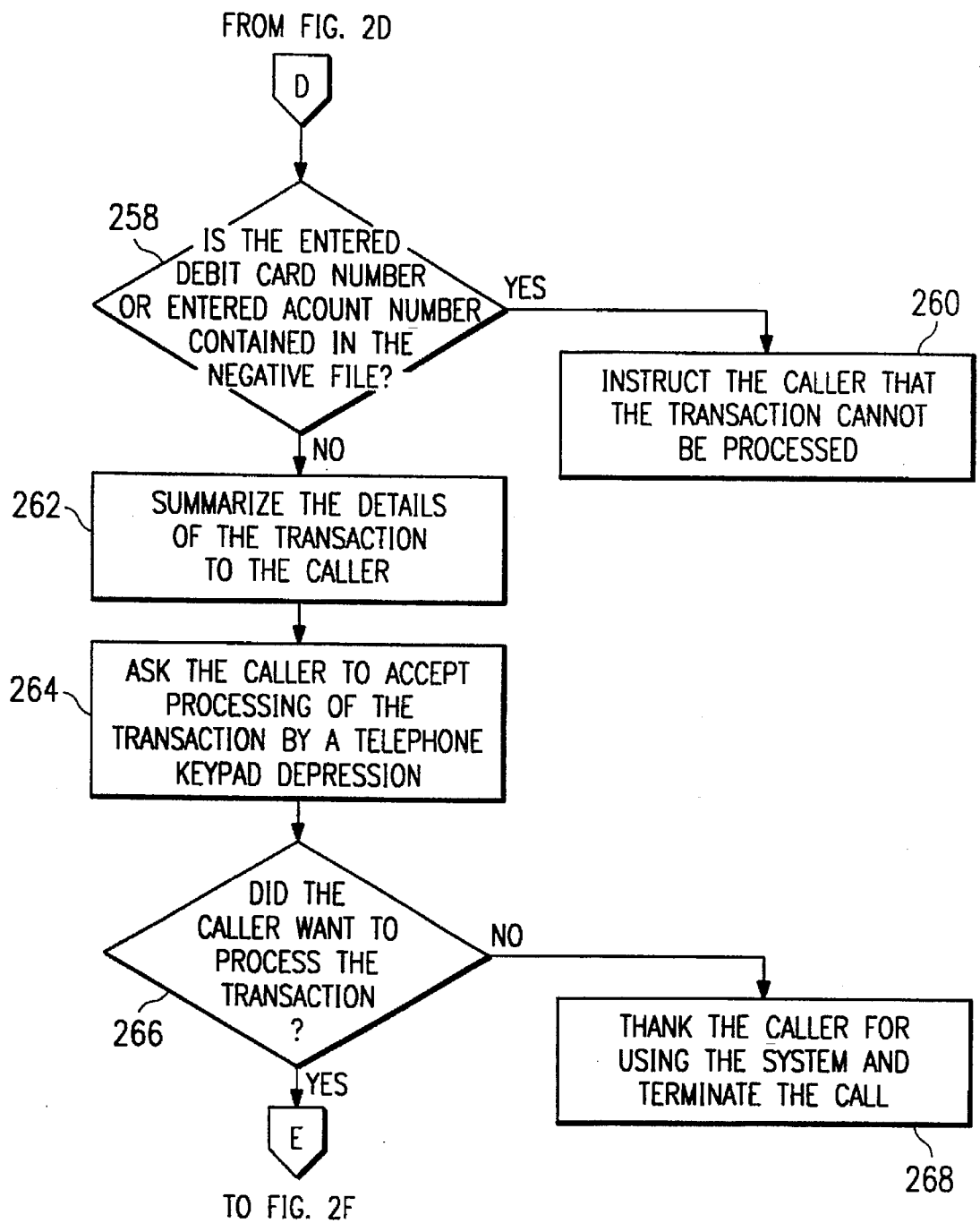
Figure 2F:
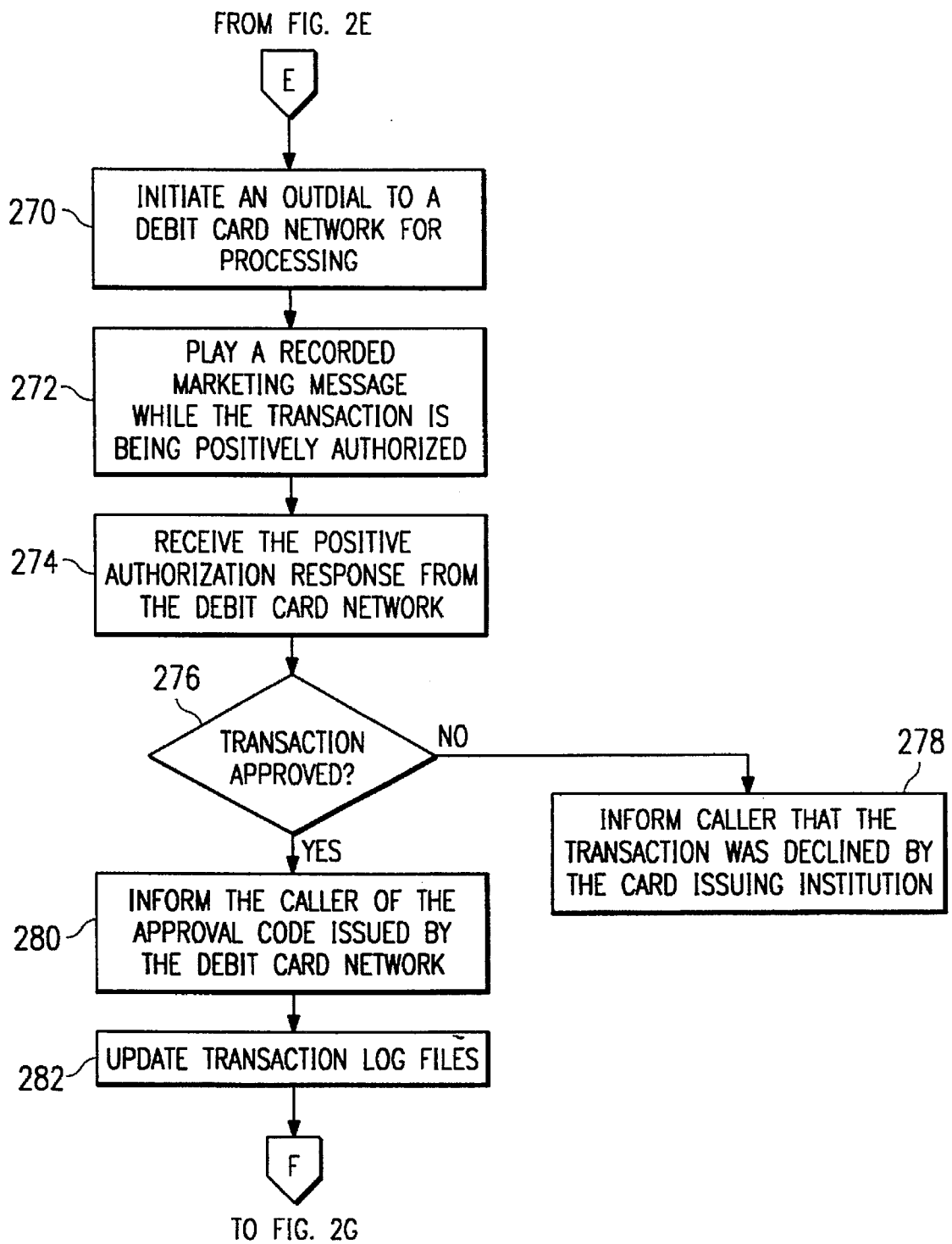
Figure 2G:
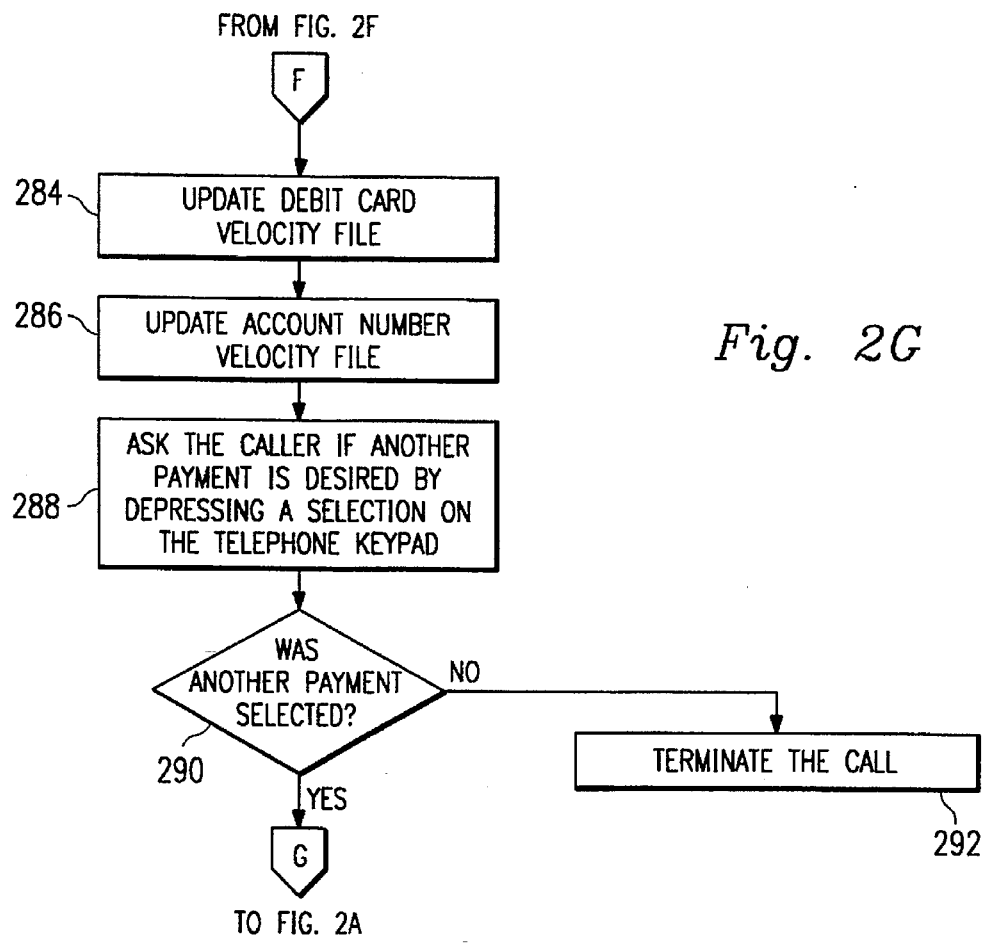

In step 284 (FIG. 2G), when a transaction is successfully completed, the aforementioned debit card number velocity file that was checked as part of the pre-processing procedures is updated to reflect the transaction. In step 286, the velocity file for the account number of the bill that was paid is updated to reflect the transaction. In step 288, the system 10 asks the caller if he or she would like to pay another bill by requesting the caller to press one (1) to pay another bill, or two (2) to terminate the call. In step 290, the system 10 makes a determination as to whether the caller would like to make another payment, based on the response indicated by the caller. If a one was pressed, the system 10 prompts the caller for another access code in step 202 (FIG. 2A). If a two is pressed, the system 10 terminates the call in step 292.

FIG. 3 is a flowchart of the settlement process of the present invention. After close of the business day, by the debit card network 20, the debit card network 20 begins to move the funds electronically; a process with which those skilled in the art are familiar. At that point the system 10 is in a position to transmit the detail of the days transactions to the individual payees that will be receiving electronic credits from the debit card network 20. The debit card networks transmit only the gross dollar amount of funds for crediting to each payee. The system 10 performs the actual detail of the electronic transmission of individually paid accounts. The system 10 will recognize the time of day by the internal clock common to most computer systems, and select the first payee in the aforementioned transaction log file. In step 300, the system 10 will outdial using an ordinary telephone line into the first payee on the system in an effort to connect to the computer billing system 26 (FIG. 1.1).

Once a telephonic connection is established, in step 302, the system 10 begins the process of transmitting the payor account numbers and amounts of the bills that were paid since the last settlement period using the system 10. This process is known to those skilled in the art as remote job entry (RJE). In step 314, the system 10 determines Whether there are other files to be transmitted. In step 306, the system 10 outdials the appropriate telephone number established in advance to establish a telephonic RJE link with the next payee. in step 302, in a manner similar to the aforementioned, the transactions that the system 10 performed in favor of that particular payee will be transmitted to that payee's computer billing system 10. Once all the files have been transmitted, the settlement process is terminated in step 308.

Figure 4:
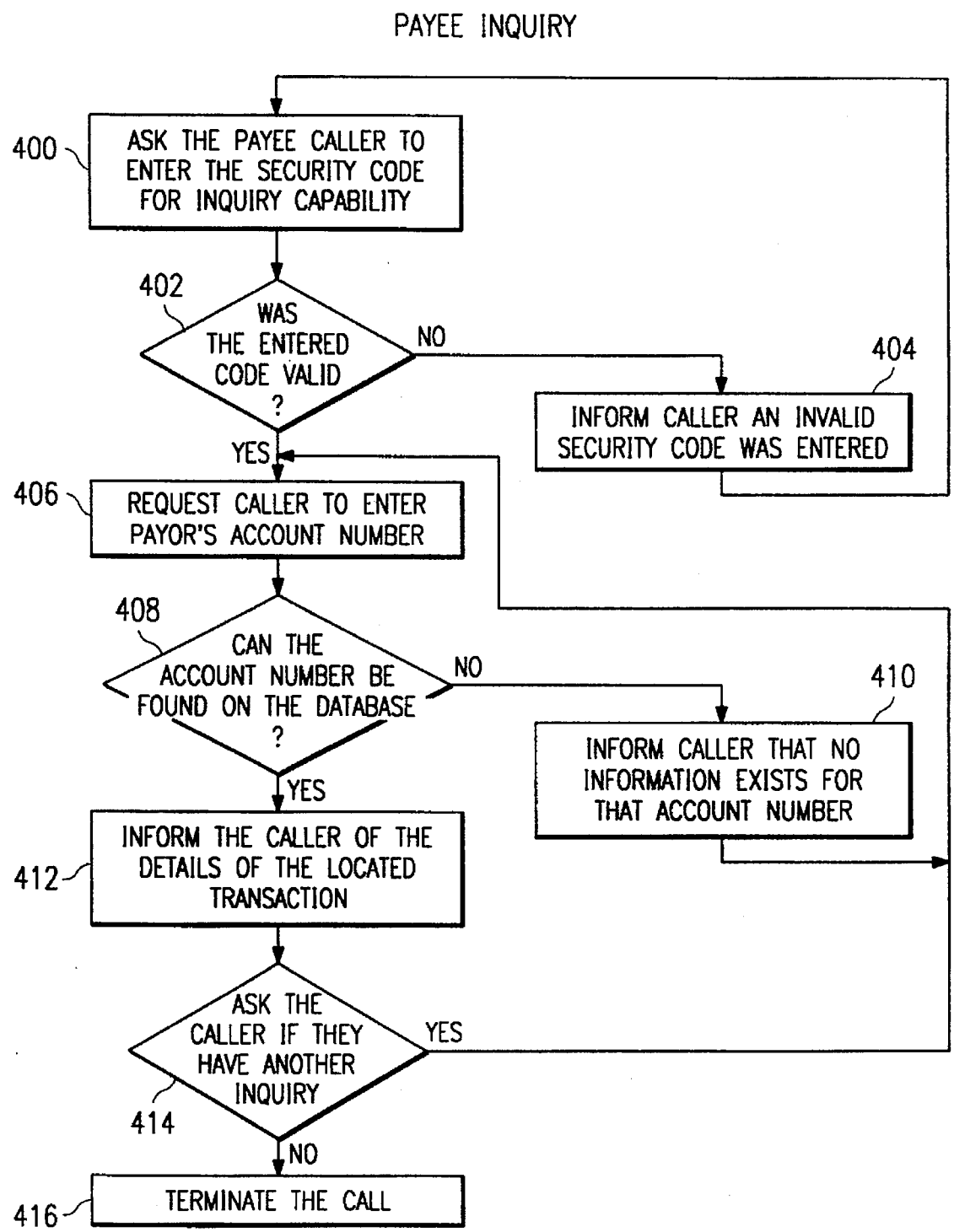
FIG. 4 is a flowchart of a payee inquiry process of the present invention.

FIG. 4.1 is a flowchart of a payee inquiry process of the present invention, which provides a payee with the ability to initiate a telephone call into the present invention operating as a third party to the transaction, in order that payment information can be discerned in conjunction with a touch tone telephone, The process is initiated by a payee calling into the system 10. In step 400, the system 400 will ask the caller to input a security code, which is assigned to each payee and is different for each payee, The input of a proper code will indicate to the system which payee payments are to be inquired upon. Without a proper code, no inquiry access is permitted. It is important to recognize that this system capability is for the payee, and not for the actual payor of the bill. This system capability assists in past due collection activity.

In step 402, the system 10 checks its internal data files to ascertain the validity of the code entered. If an improper code is entered, in step 404, the system 10 informs the caller that the code is invalid. If the entered code matches one that was contained in the system database, in step 406, the system 10 requests the caller to enter the account number of the customer whose bill is being inquired upon. After the caller enters the account number, in step 408, the system attempts to locate it on the system database. If the system 10 cannot locate the account number, in step 410, the caller is informed that no payment exists for the entered account number and is given an opportunity to enter another account number in step 406. If the entered account number is located, tin step 412, the system 10 informs the caller of the details of the transaction, to wit, time, date, amount, and authorization number of the payment, In step 414, upon completion of the audio text information, the caller is asked whether he or she has another inquiry to perform. If so, in step 406, the system 10 prompts the caller to enter the account number; otherwise, the system 10 terminates the call in step 416.

The crux of this invention is that bill payment transactions have never been presented to the debit networks for a real-time authorization initiated by the consumer from a touch tone telephone with the debit card number used as the transaction vehicle. Additionally, this process has never been done without the requirement of a PIN (personal identification number) and still maintain an assemblage of transaction security. In the TelePay System, when a transaction is entered by a consumer, and subsequently passed on to an outside debit card network for authorization, a number of things happen. Assuming that the transaction is authorized, then any fee that the customer is paying, in addition to the actual bill payment, is automatically deducted from the payor's account immediately and added to the amount that the debit-card network will distribute between TelePay and the payee at settlement. The amount of the bill that was paid is automatically added to the amount that will be credited to the payee at the end of the business day (every payee is required to provide a bank account number that will be used to electronically credit the days receipts). TelePay's bank account will, in a like manner, be automatically credited for the transaction fee. Any network usage fees that have to be paid to process the transaction by the use of an debit card network will be electronically paid by TelePay to the appropriate service provider. Once a day at TelePay's settlement time, each payee participating in the system will receive the electronic on-line detail summary of the days individual transactions for posting to the consumer's account.

The following criteria and conditions are part of the TelePay method and unique process prior to the acceptance of a debit card number into the system in order to ensure a proper transaction has been presented and to add a level of usage security. First, a service address (telephone number or residential electricity site, etc.) or payee account number can only be the recipient of a specific limited number of payments within 30 days that is selectable by the funds recipient and a velocity file by account number is kept at the TelePay system tracking this limitation. In addition, a debit card number can only be used in the TelePay system a specific limited number of times based on a recipient of funds selectable parameter and current recipient of funds (payee) negative files due to adverse experience are added to the TelePay system prior to implementation.

Still further, any consumer chargebacks will prevent that customer's telephone number/electricity service address number and that credit/debit card number to have system access. Appropriate additions will be made to the negative file unless specific overrides are requested by the funds recipient. Also, all transactions will be routed electronically to the card issuing entity/network by the TelePay system for positive authorization as to card acceptability, credit limit guidelines, payment status, balance availability, and any and all criteria that the issuer deems appropriate.

Additionally, the TelePay system will provide records of all declinations by card number and by telephone number, electric service account number, or payer account number, whichever is appropriate and a check will be done on all debit card numbers entered into the TelePay system to ensure that the input number is an assigned number within the criteria of the issuing entities, as well as on service address account numbers to insure that the proper number and sequence of digits have been entered to add an additional level of accuracy to the numeric entry process. Moreover, the customer will always be given positive audio reinforcement at critical steps during the data entry process to assist in the entry of accurate information and transaction declinations due to non-sufficient funds will be audio referred for the consumer to contact their card issuing institution.

Accordingly, it is clear that the TelePay system is a technologically advanced and consumer convenient process. The consumer may use the TelePay system to pay bills at will, spontaneously, without any personal investment in equipment, and any requirement of pre-registration. The use of the TelePay system is not tied to a specific locations, as any touch tone telephone will suffice. Use of this unique process will eliminate the use of stamps, envelopes, the U.S. Postal Service, and the necessity of going to a mailbox. Personal computers and the lack of realistic portability are problems that do not exist in the present invention. Receipt of payment is also assured and issues of lost in the mail or mail delays will no longer exist. Debit cards will now have true utility as transaction vehicles in order to electronically present payment as opposed to paper checks. Older technology of pre-registration and direct debit registration systems will become obsolete.

It is understood that the present invention can take many forms and embodiments. The embodiments shown herein are intended to illustrate rather than to limit the invention, it being appreciated that variations may be made without departing from the spirit of the scope of the invention. For example, it is anticipated that the payor may be an individual or an institution, such as a corporation or association.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A system for enabling a caller to pay bills using a telephone connectable to at least one remote payment card network via a telepay system, wherein a payor places a call to said telepay system using said telephone to initiate a spontaneous payment transaction, the system further comprising:

means for prompting said caller to enter an access code identifying a spontaneous payment transaction which does not require payor pre-registration, for a payee corresponding to said access code, such that said caller may subsequently select a form of payment for said transaction independent from said access code;

means responsive to entry of an access code for determining whether said entered access code is valid;

means for prompting said caller to enter an account number;

means responsive to entry of an account number for determining whether said entered account number is valid;

means for prompting said caller to enter a payment card number;

means responsive to entry of a payment card number for determining whether said entered payment card number is valid;

means for prompting said caller to enter a payment amount or partial payment amount determined by said caller for said payment transaction using said telephone keypad; and means responsive to a determination that a payment amount has been entered and further responsive to a determination that said entered access code, account number, payment card number and payment amount are valid, for during said call, accessing a remote payment card network associated with said entered payment card number, said accessed remote payment card network determining whether sufficient available credit or funds exist in an account associated with said entered payment card number to complete said current payment transaction, said remote payment card network not comprising an automated clearing house;

means responsive to a real time determination that sufficient available credit or funds exist in said associated account for during said call, charging said entered payment amount against said account associated with said entered payment card number, adding said entered payment amount to an account associated with said entered account number and informing said caller of an approval code issued by said accessed remote payment card network and storing said entered access code, account number, payment card number and payment amount in a transaction log file of said telepay system; and means responsive to a real time determination that sufficient available credit or funds do not exist in said associated account for informing said caller during said call that said current payment transaction has been declined and terminating said current payment transaction.

2. The system of claim 1 wherein said means for prompting said caller comprise an interactive voice response unit of said telepay system.

3. The system of claim 1 wherein said means for determining whether said entered account number is valid further comprises:

means responsive to a determination that said entered account number is not valid for prompting said caller to enter another account number;

means for repeating said determining and said prompting up to a predetermined number of times; and means for terminating said current payment transaction if a valid account number is not entered within said predetermined number of times.

4. The system of claim 1 further comprising:

means for determining whether a number of times said entered account number has been entered exceeds a predetermined number stored in a velocity file of said telepay system;

an interactive voice response unit connected to said telepay system and responsive to a determination that said number of times exceeds said predetermined number for informing said caller during said call that said current payment transaction cannot be processed; and means for terminating said current payment transaction after said informing.

5. The system of claim 1 further comprising:

means for determining whether a number of times said entered payment card number has been entered exceeds a predetermined number stored in a velocity file of said telepay;

means responsive to a determination that said number of times exceeds said predetermined number for informing said caller during said call that said current payment transaction cannot be processed; and means for terminating said current payment transaction after said informing.

6. The system of claim 1 further comprising:

means associated with each of said determining means for informing said caller of results said determination; and means for terminating said current payment transaction if said results of said determination are negative.

7. The system of claim 1 further comprising:

means for summarizing details of said current payment transaction to said caller;

means for prompting said caller to accept said current payment transaction; and means responsive said caller not accepting said current payment transaction, for terminating said current payment transaction during said call.

8. The system of claim 1 further comprising means for prompting said caller during said call to verify said entered payment amount.

9. The system of claim 1 wherein said means for determining whether said entered access code is valid further comprises:

means responsive to a determination that said entered access code is not valid for prompting said caller during said call to enter another access code;

means for repeating said determining and said prompting up to a predetermined number of times; and means for terminating said current payment transaction if a valid access code is not entered within said predetermined number of times.

10. The system of claim 1 wherein said means for determining whether said entered payment card number is valid further comprises:

means responsive to a determination that said entered payment card number is not valid for prompting said caller to enter payment card number;

means for repeating said determining and said prompting up to a predetermined number of times; and means for terminating said current payment transaction if a valid payment card number is not entered within said predetermined number of times.

11. The system of claim 1 further comprising means for periodically causing said telepay system to access a computer billing system of said payee and transmit to said payee's computer billing system said stored access code, account number, payment card number and payment amount from said transaction log file.

12. The system of claim 1 further comprising:

means for prompting a payee caller to enter a security code;

means responsive to entry of a valid security code for requesting said payee caller to enter a payor account number;

means for accessing a payor account number data base to locate transactions associated with said entered payor account number; and means responsive to location of at least one transaction associated with said entered payor account number for detailing said at least one transaction to said payee caller.

13. The system of claim 1 wherein said payment card number is selected at the discretion of said caller from any one of a number of credit or debit card forms of payment.

14. A method of paying bills using a telephone connectable to at least one remote payment card network via a telepay system, wherein a payor places a call to said telepay system using said telephone to initiate a spontaneous payment transaction, the method comprising the steps of:

prompting a caller to enter an access code identifying a spontaneous payment transaction which does not require payor pre-registration, for a payee corresponding to said access code, such that said caller may subsequently select a form of payment for said transaction independent from said access code;

responsive to entry of an access code, determining whether said entered access code is valid;

prompting said caller to enter an account number identifying an account of said payor with said payee in connection with said payment transaction;

responsive to entry of an account number, determining whether said entered account number is valid;

prompting said caller to enter a payment card number;

responsive to entry of said payment card number, determining whether said entered payment card number is valid;

prompting said caller to enter a payment amount or partial payment amount determined by said caller for said payment transaction using said telephone keypad;

responsive to a determination that a payment amount has been entered and further responsive to a determination that said entered access code, account number and payment card number are valid and during said call:

accessing a remote payment card network associated with said entered payment card number, said remote payment card network not comprising an automated clearing house, said accessed remote payment card network determining, during said call, whether sufficient available credit or funds exist in an account associated with said entered payment card number to complete said payment transaction;

responsive to a determination that sufficient available credit or funds exist in said associated account, charging said entered payment amount against said account associated with said entered payment card number, adding said entered payment amount to an account associated with said entered account number and informing said caller of an approval code issued by said accessed remote payment card network and storing said entered access code, account number, payment card number and payment amount in a transaction log file of said telepay system during said call; and responsive to a determination that sufficient available credit or funds do not exist in said associated account, informing said caller during said call that said current payment transaction has been declined and terminating said current payment transaction.

15. The method of claim 14 wherein said payment card number is selected at the discretion of said caller from any one of a number of credit or debit card forms of payment.

16. The method of claim 14 wherein said steps of prompting said caller are performed during said call by an interactive voice response unit of said telepay system.

17. The method of claim 14 further comprising, during said call:

determining whether a number of times said entered account number has been entered exceeds a predetermined number stored in a velocity file of said telepay system;

responsive to a determination that said number of times exceeds said predetermined number, informing said caller, using an interactive voice response unit of said telepay system that said current payment transaction cannot be processed; and terminating said current payment transaction prior to said accessing.

18. The method of claim 14 further comprising, during said call:

determining whether a number of times said entered payment card number has been entered exceeds a predetermined number stored in a velocity file of said telepay system;

responsive to a determination that said number of times exceeds said predetermined number, informing said caller using an interactive voice response unit of said telepay system that said current payment transaction cannot be processed; and terminating said current payment transaction prior to said accessing.

19. The method of claim 14 further comprising, after each of said determining steps:

informing said caller of results of said determination using an interactive voice response unit of said telepay system; and terminating said current payment transaction if said results of said determination are negative.

20. The method of claim 14 further comprising, prior to said accessing:

summarizing details of said current payment transaction to said caller using an interactive voice response unit of said telepay system;

prompting said caller to accept said current payment transaction; and responsive said caller not accepting said current payment transaction, terminating said current payment transaction.

21. The method of claim 1 wherein said payment card is a debit card.

22. The method of claim 1 wherein said payment card is a credit card.

23. The method of claim 14 wherein said step of determining whether said entered account number is valid further comprises:

responsive to a determination that said entered account number is not valid, prompting said caller to enter another account number;

repeating said determining and said prompting up to a predetermined number of times; and terminating said current payment transaction if a valid account number is not entered within said predetermined number of times.

24. The method of claim 14 wherein said step of determining whether said entered payment card number is valid further comprises:

responsive to a determination that said entered payment card number is not valid, prompting said caller to enter payment card number;

repeating said determining and said prompting up to a predetermined number of times; and terminating said current payment transaction if a valid payment card number is not entered within said predetermined number of times.

25. The method of claim 14 further comprising periodically performing a settlement process, said settlement process comprising:

accessing a computer billing system of said payee; and transmitting to said payee's computer billing system said stored access code, account number, payment card number and payment amount from said transaction log file.

26. The method of claim 14 further comprising:

prompting a payee caller to enter a security code;

responsive to entry of a valid security code, requesting said payee caller to enter a payor account number;

accessing a payor account number data base to locate transactions associated with said entered payor account number; and responsive to location of at least one transaction associated with said entered payor account number, detailing said at least one transaction to said payee caller.

27. The method of claim 1 wherein said payment card is a debit card.

28. The method of claim 1 wherein said payment card is a credit card.

29. The method of claim 14 further comprising prompting said caller to verify said entered payment amount prior to said accessing.

30. The method of claim 14 wherein said step of determining whether said entered access code is valid further comprises:

responsive to a determination that said entered access code is not valid, prompting said caller to enter another access code;

repeating said determining and said prompting up to a predetermined number of times; and terminating said current payment transaction if a valid access code is not entered within said predetermined number of times.

* * * * *